(No Model.)

L. A. SMITH.
POCKET KNIFE.

No. 306,651. Patented Oct. 14, 1884.

WITNESSES:

L. A. Smith
INVENTOR.
By Louis Bagger & Co.
ATTORNEYS.

N. PETERS, Photo-Lithographer, Washington, D. C.

UNITED STATES PATENT OFFICE.

LUKE ALBERT SMITH, OF LUDINGTON, MICHIGAN.

POCKET-KNIFE.

SPECIFICATION forming part of Letters Patent No. 306,651, dated October 14, 1884.

Application filed June 3, 1884. (No model.)

*To all whom it may concern:*

Be it known that I, LUKE A. SMITH, a citizen of the United States, and a resident of Ludington, in the county of Mason and State of Michigan, have invented certain new and useful Improvements in Pocket-Knives; and I do hereby declare that the following is a full, clear, and exact description of the invention, which will enable others skilled in the art to which it appertains to make and use the same, reference being had to the accompanying drawings, which form a part of this specification, and in which—

Figure 1:
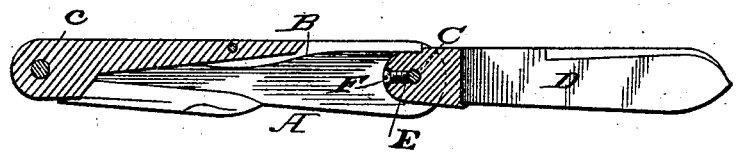
Figure 2:

Figure 1 is a longitudinal sectional view of a pocket-knife, illustrating one form of my invention; and Fig. 2 is a side view of the blade detached.

The same letters refer to the same parts in both figures.

This invention has for its object to so construct a pocket-knife that a broken blade may be easily detached and a new one inserted by an unskilled person and without the use of any tools, except, perhaps, a small screw-driver.

To this end it consists in the improved construction and arrangement of parts, which will be hereinafter fully described, and particularly pointed out in the claim.

A in the drawings designates the handle of my improved pocket-knife, which is constructed with the ordinary spring-back B, and provided at its end or ends with the ordinary rivets C, upon which the blades are adapted to swing. The blade or blades D are provided at their rear ends with horizontal slots E, the outer ends of which are screw-threaded, so as to receive the small screw-plugs F.

The operation of this form of my invention will be easily understood by reference to the drawings. If a blade should break, it is only necessary to remove the plug F from the rear end of the same, when the broken stump will easily slide off the pivoting pin or rivet, thus enabling a new blade to be inserted in its place and secured in the same manner.

Having thus described my invention, I claim and desire to secure by Letters Patent of the United States—

In a pocket-knife, the combination of a handle having suitable pivoting-pins for the blades, the blades having slots whereby they may be mounted upon the said pivoting-pins, and screw-plugs adapted to enter the outer ends of the said slots for the purpose of securing the blades in position, substantially as set forth.

In testimony that I claim the foregoing as my own I have hereunto affixed my signature in presence of two witnesses.

LUKE ALBERT SMITH.

Witnesses:
WM. G. BRITTON,
WILLIAM FOY.